United States Patent
Saito et al.

[11] Patent Number: 6,141,615
[45] Date of Patent: Oct. 31, 2000

[54] DOWN-SHIFT CONTROL SYSTEM BASED ON DRIVER'S INTENTION FOR ACCELERATION

[75] Inventors: Yoshiharu Saito; Yasushi Inagawa; Takanori Kon; Masamitsu Fukuchi; Masakazu Shiraishi; Kazutomo Sawamura, all of Wako, Japan

[73] Assignee: Honda Giken Kogyo Kabushiki Kaisha, Tokyo, Japan

[21] Appl. No.: 09/140,599

[22] Filed: Aug. 26, 1998

[30] Foreign Application Priority Data

Aug. 26, 1997 [JP] Japan ..................................... 9-231583

[51] Int. Cl.$^7$ ........................................................ G06F 7/00
[52] U.S. Cl. ............................... 701/51; 477/34; 477/108; 123/319
[58] Field of Search .................................. 701/51, 70, 79, 701/96, 64; 477/34, 107, 108, 132, 166; 123/319

[56] References Cited

U.S. PATENT DOCUMENTS

| 4,380,048 | 4/1983 | Kishi et al. | 364/424 |
| 5,421,791 | 6/1995 | Futawatari | 475/117 |
| 5,428,531 | 6/1995 | Hayafune | 701/65 |

FOREIGN PATENT DOCUMENTS

0270194A2 6/1988 European Pat. Off. .
0907043A1 4/1999 European Pat. Off. .

OTHER PUBLICATIONS

Communication—Search Report (International) Jan. 11, 2000.

Primary Examiner—William A. Cuchlinski, Jr.
Assistant Examiner—Yonel Beaulieu
Attorney, Agent, or Firm—Lyon & Lyon LLP

[57] ABSTRACT

A down-shift control system is provided, by which if sufficient torque cannot be obtained for an acceleration request or intention at a shift position, a down-shift operation is suitably performed so as to realize a reliable driving capability and no shift-busy phenomenon occurs. The system includes a section for calculating target driving force of a vehicle according to a degree of opening of an accelerator pedal and a speed of the vehicle; a section for detecting the present shift position of the vehicle; a section for calculating target engine torque based on the target driving force and the present shift position; a section for comparing the target engine torque with a set value determined according to torque characteristics of the engine; a section for performing an accumulating operation relating to the degree of opening if it is judged that the target engine torque equals or exceeds the set value; and a section for outputting a down-shift command if the accumulated value exceeds a threshold relating to the degree of opening.

18 Claims, 5 Drawing Sheets

| F_MTDN1 | 0 | 1 | 0 |
|---|---|---|---|
| F_MTDN2 | 1 | 1 | 0 |
| STATE | Te>TEMAX~ DOWN-SHIFT START | DOWN-SHIFT START~ ΔAP SMALL | NORMAL |
| | | SHIFT HOLD | |

DOWN-SHIFT CONTROL SYSTEM BASED ON DRIVER'S INTENTION FOR ACCELERATION

BACKGROUND OF THE INVENTION

1. Field of the Invention

The present invention relates to a down-shift control system used in a vehicle having an automatic transmission.

This application is based on Patent Application No. Hei 9-231583 filed in Japan, the contents of which are incorporated herein by reference.

2. Description of the Related Art

Conventionally, instead of a mechanical system in which an amount of force imposed on an accelerator pedal and a degree of opening of a throttle valve are changed in a mechanically interlocking situation, an electric control system for controlling a throttle valve is known in which the degree of opening of a throttle valve with respect to the amount of force imposed on an accelerator pedal is automatically adjusted based on a driving condition.

Japanese Patent Application, First Publication, No. Hei 5-139188 discloses the following shift-switching control based on such a throttle control system performing electric control (hereinafter, simply called the "throttle control system"). The disclosed technique is such that a down-shift operation is executed in case of need, according to a first judgment following a shift map which indicates each optimal shift position based on a relationship between the degree of opening of the throttle valve and the speed of the vehicle, and to a second judgment for performing a down-shift operation if the engine does not have fully enough torque, based on a difference between the maximum torque and target torque at the relevant shift position.

However, the driving situation of the vehicle is considerably influenced according to which of the two judgments (i.e., one based on the shift map and the other based on the amount of residual torque) is given priority for switching the shift position.

Practically, if the judgment based on the shift map is given priority, the downshift operation is never performed unless the operational line on the shift map crosses a boundary corresponding to a switching operation. Therefore, the down-shift switching operation cannot follow the manipulation of the accelerator pedal, and thus the driving capability is lowered. On the other hand, if the judgment based on the residual torque is given priority, a down-shift operation is performed even for an instantaneous insufficiency of the engine torque and according to this down-shift operation, surplus engine torque is generated and an up-shift operation is next performed. That is, the switching operation is repeatedly performed (i.e., a "shift- busy" phenomenon occurs).

SUMMARY OF THE INVENTION

In consideration of the above circumstances, an object of the present invention is to provide a down-shift control system by which if sufficient torque cannot be obtained for an acceleration request or intention at a shift position, a down-shift operation is suitably performed so as to realize a reliable driving capability and no shift-busy phenomenon occurs.

In order to realize the above object, a preferred embodiment of the present invention provides a downshift control system comprising: target driving force calculating means for calculating target driving force of a vehicle according to a degree of opening of an accelerator pedal and a speed of the vehicle; shift position detecting means for detecting the present shift position of the vehicle; target engine torque calculating means for calculating target engine torque based on the target driving force and the present shift position; comparison means for comparing the target engine torque with a set value determined according to torque characteristics of the engine of the vehicle; accumulation means for performing an accumulating operation relating to the degree of opening of the accelerator pedal if it is judged by the comparison means that the target engine torque equals or exceeds the set value; and down-shift control means for outputting a command for executing a down-shift operation if an accumulated value obtained by the accumulation means exceeds a threshold relating to the degree of opening of the accelerator pedal.

According to the above accumulating operation, it can be judged whether intention for acceleration of the driver is continued, and the down-shift operation can be executed based on this judgment.

It is possible that the down-shift control means outputs the command for executing the down-shift operation when the increase of the degree of opening of the accelerator pedal exceeds a threshold during the accumulating operation relating to the degree of opening of the accelerator pedal. In this case, it is possible to judge whether the driver has strong intention for acceleration, and to perform the down-shift operation so as to reliably make the intention for acceleration reflected in the driving environment of the vehicle.

It is also possible that:
(1) the accumulation means comprises a counter whose count value is increased every time it is judged that the target engine torque exceeds the set value; or
(2) the accumulation means detects a duration time of pressing the accelerator pedal measured from the time when it is judged that the target engine torque exceeds the set value.

In theses cases, it is possible to judge whether the intention for acceleration is continued via simple software processing and to suitably perform the down-shift operation.

In addition, after the target engine torque exceeds the set value, the accumulation means may discontinue the accumulating operation if an increase of the degree of opening of the accelerator pedal equals or exceeds a predetermined level. In this case, it is possible to more reliably judge whether the intention for acceleration is continued, and to prevent unnecessary down-shift operations and perform a downshift operation based on more reliable judgment.

Accordingly, in the present invention, whether the engine torque has a necessary margin is judged based on the degree of opening of the accelerator pedal. If it is judged that the engine torque has no margin and thus the down-shift operation is necessary, and also if it is judged that the intention for acceleration of the driver is continued, then the down-shift operation is executed. Therefore, desirable driving capability can be obtained based on the driver's intention for acceleration, and it is possible to prevent a situation in which the shift-switching operation is unnecessarily and repeatedly performed.

DESCRIPTION OF THE PREFERRED EMBODIMENTS

Figure 1:
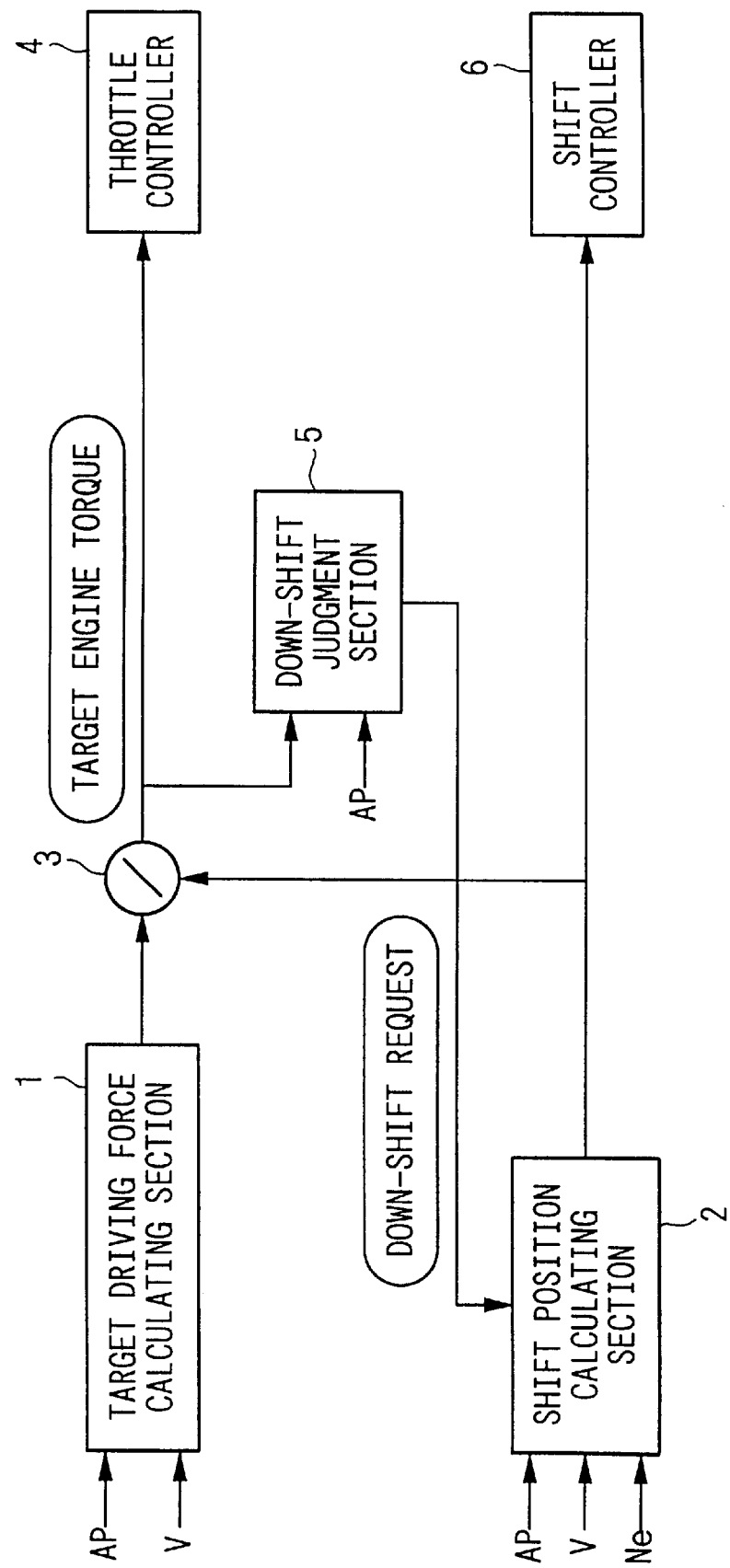
FIG. 1 is a block diagram showing the construction of the down-shift control system as an embodiment according to the present invention.

With reference to FIG. 1, the down-shift control system as an embodiment according to the present invention will be explained.

Figures 5, 6:
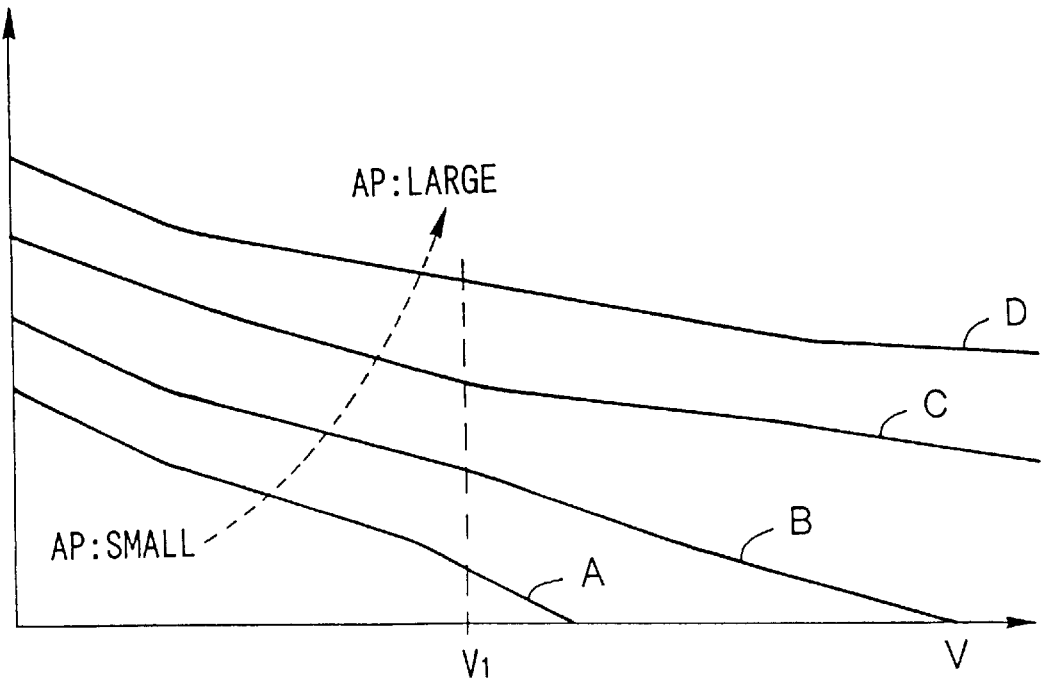
FIG. 5 shows the changes of the state of each flag in the embodiment.
FIG. 6 shows a diagram which indicates a relationship between the target driving force, the speed, and the degree of opening of the accelerator pedal.

In the figure, reference numeral 1 indicates a target driving force calculating section which calculates a target driving force (i.e., torque to be generated by the engine) according to the intention for acceleration of a driver, based on control force AP of the accelerator pedal (i.e., the degree of opening of the accelerator pedal) and speed V of the vehicle. That is, the target driving force calculating section 1 stores a map which indicates a relationship between the target driving force and speed V for each degree of opening of the accelerator pedal, as shown in FIG. 6. In FIG. 6, the degree of opening AP of the accelerator pedal is gradually increased in order starting from line A→line B→line C→line D. Regarding a speed V1, if the degree of opening of the accelerator pedal is small as shown by line A, then it is judged that acceleration to have a larger speed is not so desired and thus the target driving force is small, while if the degree of opening of the accelerator pedal is large as shown by line D, then it is judged that acceleration to have a speed larger than the present speed is desired and thus the target driving force is large.

Reference numeral 2 indicates a shift position calculating section which stores a shift map indicating a relationship between the degree of opening AP, speed V, and engine speed "Ne". The shift position calculating section 2 also outputs a down-shift command based on a result of judgment by a down-shift judgment section 5 which is explained later.

Signals indicating the target driving force and the shift position are supplied to calculator 3 which calculates necessary target engine torque based on the target driving force and a reduction gear ratio corresponding to the shift position. The target engine torque calculated by the calculator 3 is supplied to throttle controller 4, and this controller 4 outputs a command for adjusting the throttle valve to have a degree of opening necessary for realizing the target engine torque. The target engine torque is also supplied to down-shift judgment section 5 which judges the necessity of a down-shift operation based on the degree of opening AP of the accelerator pedal and the target engine torque.

If it was judged by the down-shift judgment section 5 that a down-shift operation is necessary, then a down-shift command is output from the down-shift judgment section 5 to the shift position calculating section 2. This shift position calculating section 2 sends shift controller 6 a signal which indicates the same shift position as the present position, or a signal which indicates a new shift position after a down-shift operation. Which signal is sent is determined by the shift position calculating section 2, based on a signal indicating the present shift position and on the presence/absence of a down-shift command. The shift controller 6 which received the signal outputs a command for driving a mechanism relating to the down-shift operation, so as to realize the corresponding shift position.

Figure 2:
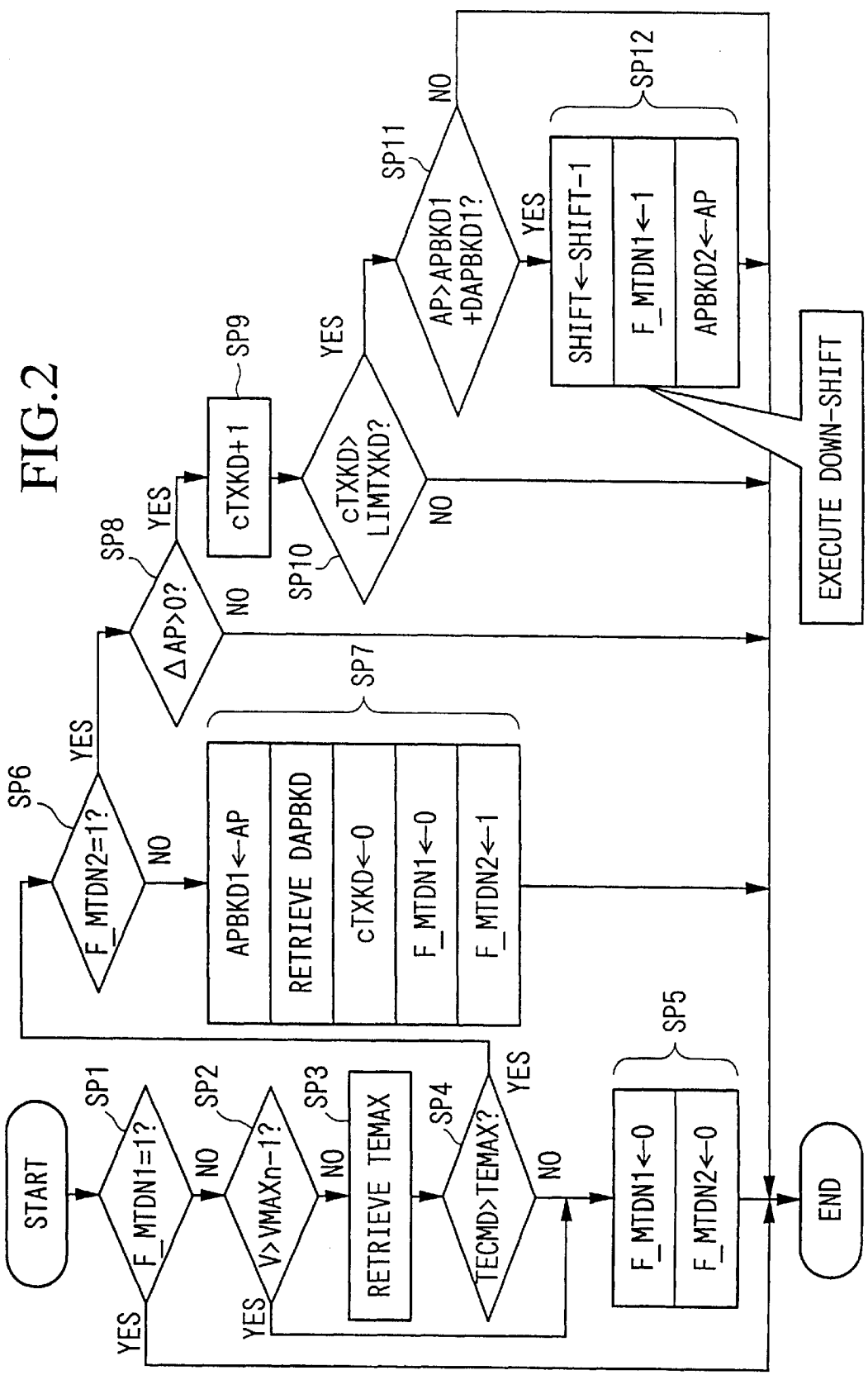
FIG. 2 is a flowchart of the processing of the down-shift control performed in the embodiment.

Hereinafter, the control performed by the down-shift judgment section 5 will be explained with reference to the flowchart of FIG. 2, in connection with general operations of the down-shift control system.

Step SP1: It is judged whether or not a flag MTDN1 (i.e., "F_MTDN1") is 1. If "No", then processing shifts to step SP2, while if "Yes", processing is terminated. This flag MTDN1 and another flag MTDN2 (i.e., "F_MTDN2") indicate the present state of the down-shift control. Conditions for setting and resetting these flags will be explained later.

Step SP2: It is judged whether a measured speed (V) is larger than down-shift limit speed "VMAXn-1" at shift position "n-1" lower than the present shift position "n". If "No", then processing shifts to step SP3, while if "Yes", processing jumps to step SP5. The above "VMAX" is data which is previously determined for each shift position based on mechanical performance of the transmission or the like, and is stored in a predetermined memory area. That is, even if it is judged that a down-shift operation should be performed, damage to the transmission or the like can be prevented by restraining a down-shift operation when speed V is larger than the relevant down-shift limit speed VMAXn-1.

Step SP3: A relationship between engine speed Ne and engine torque Te is previously stored in a ROM as a table of the torque characteristics, and according to the table, a previously-set value TEMAX of the engine torque is retrieved. This set value indicates possible output engine torque on the assumption that the degree of opening of the throttle is set (by the throttle controller) to be maximum at the present shift position n.

Step SP4: It is judged whether target or desired engine torque TECMD, which was determined based on the degree of opening AP of the accelerator pedal, is larger than the above-mentioned set value TEMAX, that is, whether the target engine torque exceeds the set value and thus has a considerable level. If "Yes", then processing shifts to step SP6, while if "No", then the present torque is sufficient and no down-shift operation is necessary, and thus processing shifts to step SP5.

Step SP5: The flags MTDN1 and MTDN2 are cleared.

Step SP6: It is judged whether flag MTDN2 is set to be 1. If "No", then processing shifts to step SP7, while if "Yes", then processing shifts to step SP8.

Step SP7: The following parameters are each set to a predetermined value.

A degree of opening APBKD1 of the accelerator pedal at the time of starting judgment is set to be a measured value of the degree of opening AP of the accelerator pedal.

The table previously stored in the ROM is searched for threshold DAPBKD1 (for the execution of the down-shift control) and threshold DAPBKD2 (for the termination of the down-shift control) of an amount of change ΔAP of the degree of opening of the accelerator pedal, these thresholds being criteria for executing and terminating the down-shift control. Generally, the higher the speed, the degree of opening of the accelerator pedal necessary for acceleration becomes large; thus, threshold DAPBKD1 also becomes large.

Count value "cTXKD" of a counter, which is increased by 1 for each increasing change of the above amount of change ΔAP, is reset to zero 0.

The flag MTDN1 is cleared and the flag MTDN2 is set to be 1.

Step SP8: It is judged whether the amount of change ΔAP of the degree of opening of the accelerator pedal is positive. If "Yes", then processing shifts to step SP9, while if "No", then it is judged that the driver has no intention for further acceleration by pressing the accelerator pedal and the control is terminated.

Step SP9: The count value "cTXKD" of the counter is increased by 1.

Step SP10: It is judged whether the count value cTXKD exceeds threshold LIMTXKD of accumulated degree of opening of the accelerator pedal. If "Yes", then processing shifts to step SP11, while if "No", then it is judged that the increase of the degree of opening of the accelerator pedal is not strongly intended (that is, acceleration is not strongly desired) and the control is terminated.

Step SP11: The sum of the degree of opening APBKD1 of the accelerator pedal at the time of starting the down-shift control and threshold DAPBKD1 for judging execution of the down-shift control is compared with the degree of opening AP of the accelerator pedal. If the degree of opening AP is larger than the above sum, then processing shifts to step SP12, while if the degree of opening AP is smaller than or equal to the sum, then it is judged that no down-shift operation is necessary and control is terminated. That is, with a condition in which the amount of increase of the degree of opening AP of the accelerator pedal is larger than the threshold (DAPBKD1), processing shifts to step SP12 so as to execute a down-shift operation.

Step SP12: Parameters for executing the down-shift operation are set as follows. Parameter SHIFT which indicates the shift position is set to be "SHIFT-1". That is, "1" is subtracted from the value of parameter SHIFT (which indicates the shift position), and thereby the value for indicating a one-step lower shift position is determined.

The flag MTDN1, which indicates a state that the down-shift operation is under execution, is set to be 1.

As a result, judgment in step SP1 is always "Yes" unless flag MTDN1 is cleared; thus, the system is in a shift-hold state in which the shift position of "SHIFT-1" is maintained.

A degree of opening APBKD2 of the accelerator pedal at the time of executing a down-shift operation is set to be a corresponding degree of opening AP.

Figure 3:
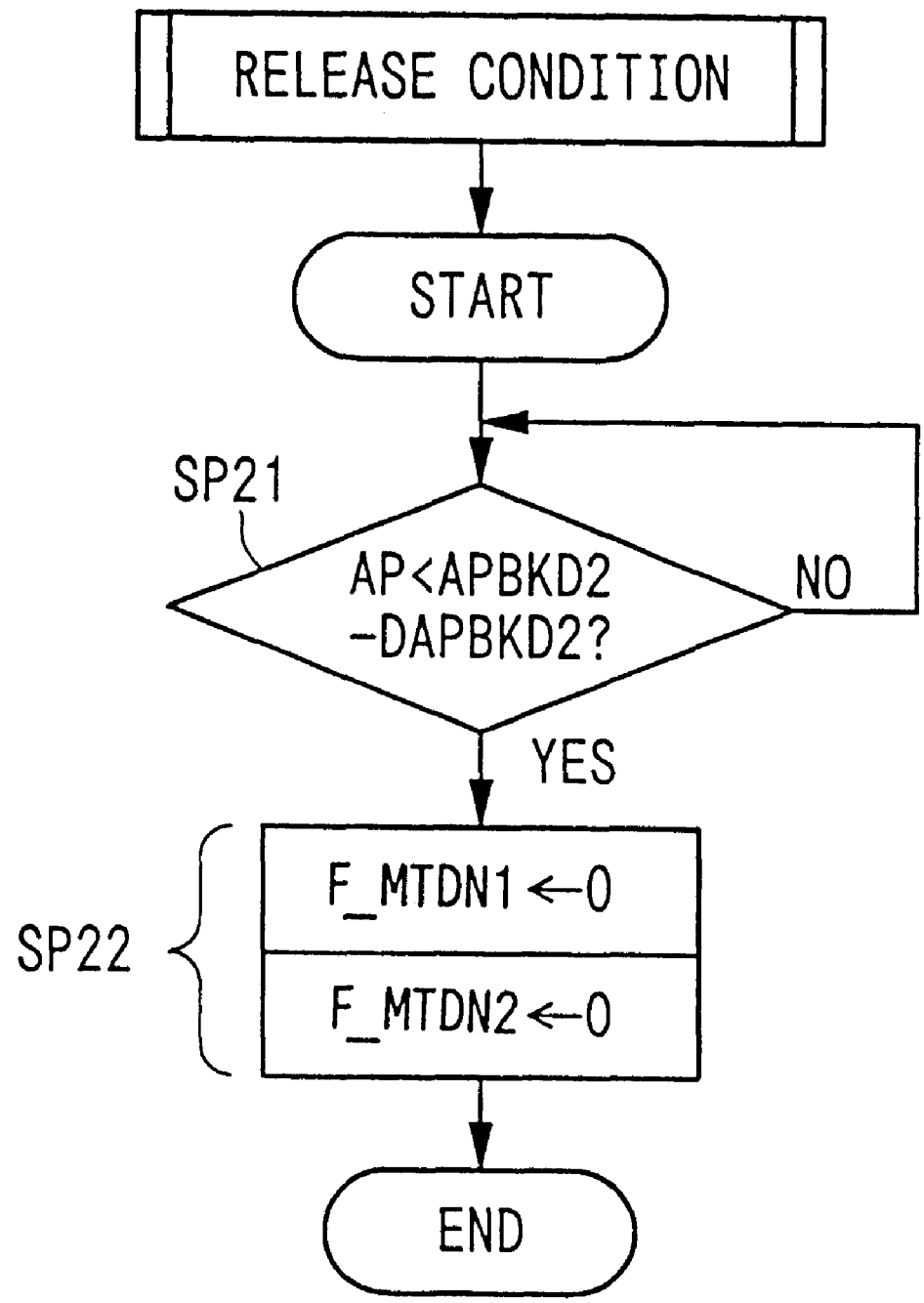
FIG. 3 is a flowchart showing operations for releasing the shift-hold state in the embodiment.

On the other hand, operations for releasing the shift-hold state will be explained with reference to the flowchart in FIG. 3.

In step SP21, a value obtained by subtracting threshold DAPBKD2 (for judging termination) from the degree of opening APBKD2 of the accelerator pedal at the time of execution of the shift down control is compared with the present degree of opening AP of the accelerator pedal. That is, if it was judged that the present degree of opening of the accelerator pedal becomes lower than a predetermined value, the processing shifts to step SP22 and both flags MTDN1 and MTDN2 are cleared. Therefore, the down-shift control based on a judgment in step SP1 becomes possible and thus the shift-hold state is released. That is, if the degree of opening AP of the accelerator pedal becomes smaller than a predetermined level, then it is judged that intention for acceleration is not continued and the control for accumulating the degree of opening is terminated. While if the degree of opening AP does not become smaller than the predetermined level, then judgment in step SP21 is repeatedly performed without processing flags MTDN1 and MTDN2.

Regarding the judgment (refer to the above step SP21) for releasing the shift-hold state, instead of referring to APBKD2, another independent degree of opening of the accelerator pedal for the judgment may be provided.

Figure 4:
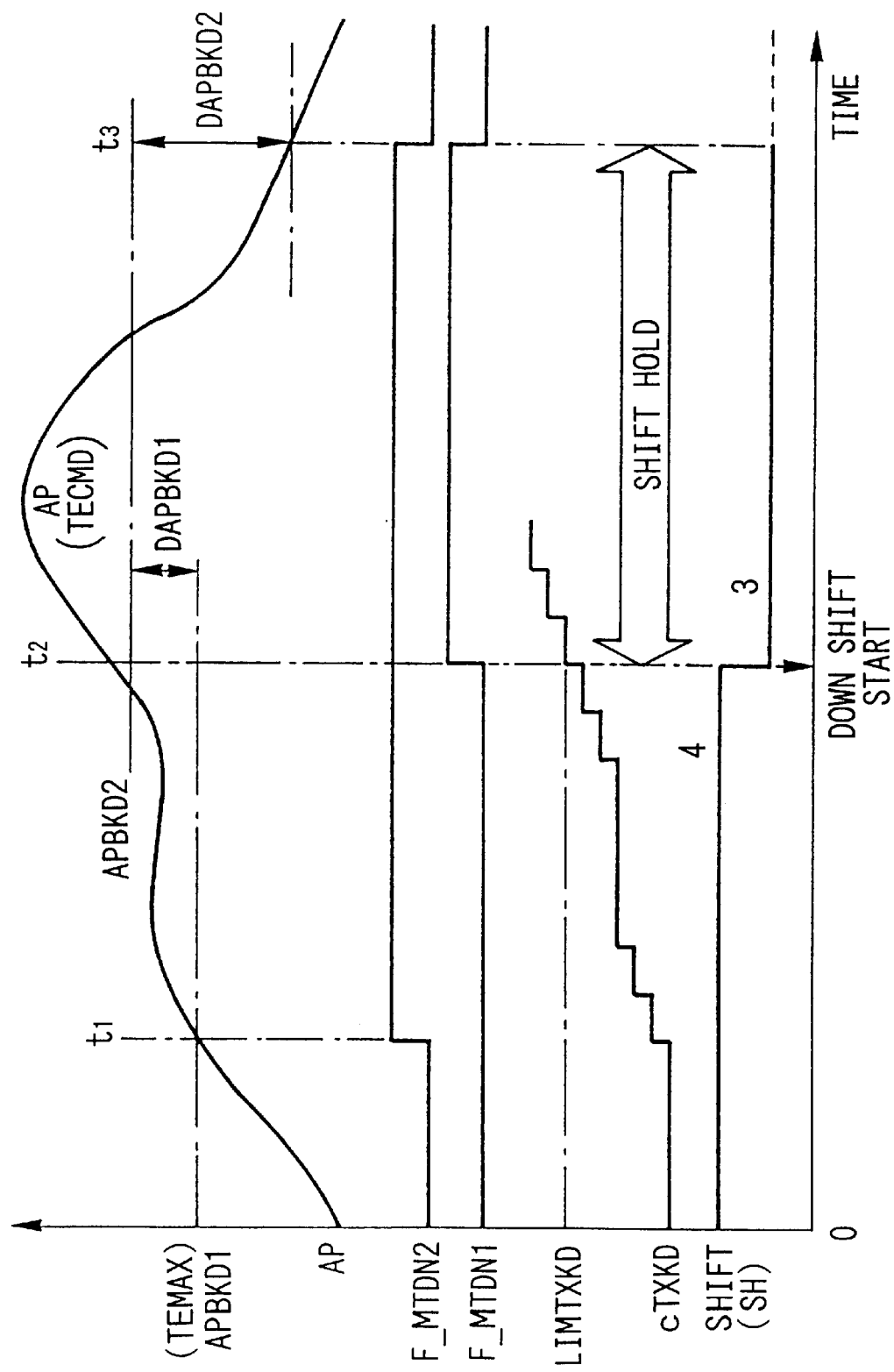
FIG. 4 is a timing chart of the down-shift control performed in the embodiment.

The above-described control will be further explained with reference to FIG. 4 which shows an example of actual variation of the degree of opening of the accelerator pedal.

From time t=0, the degree of opening AP becomes larger, and when the degree exceeds "TEMAX" at time $t_1$, then the flag MTDN2 is set to be 1 according to the operation in the above-explained step SP7. According to this operation of setting the flag MTDN2 to be 1, in the next cycle the processing proceeds in order from step SP6→SP8→SP9, and thereby the counter value "CTXKD" is increased. That is, while the degree of opening of the accelerator pedal is larger than a predetermined level, increment of the counter value cTXKD is repeated, and at time $t_2$, it is judged that the value cTXKD exceeds the threshold LIMTXKD relating to the accumulated degree of opening of the accelerator pedal. Such accumulation of the degree of opening of the accelerator pedal can be easily performed by software processing, not by using any special device. On the other hand, if the driver discontinues to press the accelerator pedal, then the value "cTXKD" is not counted up and the down-shift operation is not performed. That is, the down-shift operation is performed based only on continuous intention for acceleration of the driver.

Another method than the above-mentioned accumulation method is possible, in which if it is judged that the degree of opening of the accelerator pedal becomes larger than a threshold, then clock pulses are counted, and this count value (corresponding to an elapsed time from the time when the amount of pressing of the accelerator pedal becomes larger than a predetermined level) is used as an accumulated degree of opening of the accelerator pedal. Also in this case, the accumulation of the degree of opening of the accelerator pedal can be easily performed by software processing.

Next, if it is judged in step SP11 that the degree of opening AP of the accelerator pedal exceeds the threshold TEMAX (the maximum engine torque available in the present shift position n, which torque corresponds to the degree of opening of the accelerator pedal APBKD1 at the time $t_1$ of starting the down-shift control) by a predetermined amount DAPBKD1 or more, then it is judged that a down-shift operation should be performed at a time $t_2$. Accordingly, the flag MTDN1 is set to be 1 in step SP12 and the down-shift operation is performed. After that, the system enters into the shift-hold state. That is, when the engine torque has no margin and thus a down-shift operation is necessary, the down-shift operation is performed with a condition in which the intention for acceleration of the driver is continued. Therefore, desirable driving capability can be obtained according to a down-shift operation based on the intention for acceleration of the driver, and it is possible to prevent an undesirable situation in which the shift-change operation is excessively performed and repeated. In addition, only when the driver has a strong intention for acceleration, is it judged that a down-shift operation should be performed. Furthermore, when the amount of decrease of the degree of opening AP of the accelerator pedal exceeds threshold DAPBKD2 for termination judgment at time $t_3$, the flags MTDN1 and MTDN2 are respectively cleared in step SP22 according to the judgment performed in the previous step SP21, and the system enters into a stand-by state for the next down-shift control.

FIG. 5 shows the changes of the state of each of the flags MTDN1 and MTDN2 in the above operations. That is, while no down-shift operation is performed, each flag is maintained in the "clear" state via the process in step SP5. After engine torque Te exceeds the set value TEMAX, only flag MTDN2 is set to be 1 at which time a down-shift operation is performed. After the down-shift operation is executed, both flags MTDN1 and MTDN2 are set to be 1 until such time as the amount of decrease of the degree of opening AP of the accelerator pedal reaches the threshold APBKD2.

In the above embodiment, the down-shift control is performed using actually detected values of the degree of opening AP of the accelerator pedal. However, it is also possible that driving environment is estimated using a fuzzy control, and the degree of opening of the accelerator pedal may be amended and used based on the estimated driving environment. For example, when the vehicle goes up a slope, the detected value is multiplied by a suitable coefficient so as to increase the degree of opening of the accelerator pedal. On the other hand, during a traffic jam, the downshift control may be performed based on the degree of opening of the accelerator pedal obtained by multiplying the detected value by a suitable coefficient so as to decrease the detected value.

What is claimed is:

1. A down-shift control system comprising:

target driving force calculating means for calculating target driving force of a vehicle according to a degree of opening of an accelerator pedal and a speed of the vehicle;

shift position detecting means for detecting the present shift position of the vehicle;

target engine torque calculating means for calculating target engine torque based on the target driving force and the present shift position;

comparison means for comparing the target engine torque with a set value determined according to torque characteristics of the engine of the vehicle;

accumulation means for performing an accumulating operation relating to the degree of opening of the accelerator pedal if it is judged by the comparison means that the target engine torque equals or exceeds the set value; and down-shift control means for outputting a command for executing a down-shift operation if an accumulated value obtained by the accumulation means exceeds a threshold relating to the degree of opening of the accelerator pedal.

2. A down-shift control system as claimed in claim 1, wherein the down-shift control means outputs the command for executing the down-shift operation when an increase of the degree of opening of the accelerator pedal exceeds a threshold during the accumulating operation relating to the degree of opening of the accelerator pedal.

3. A down-shift control system as claimed in claim 1, wherein the accumulation means comprises a counter whose count value is increased every time it is judged that the target engine torque exceeds the set value.

4. A down-shift control system as claimed in claim 2, wherein the accumulation means comprises a counter whose count value is increased every time it is judged that the target engine torque exceeds the set value.

5. A down-shift control system as claimed in claim 1, wherein the accumulation means detects a duration time of pressing the accelerator pedal measured from the time when it is judged that the target engine torque exceeds the set value.

6. A down-shift control system as claimed in claim 2, wherein the accumulation means detects a duration time of pressing the accelerator pedal measured from the time when it is judged that the target engine torque exceeds the set value.

7. A down-shift control system as claimed in claim 2, wherein after the target engine torque exceeds the set value, the accumulation means discontinues the accumulating operation if the increase of the degree of opening of the accelerator pedal equals or exceeds a predetermined level.

8. A down-shift control system as claimed in claim 4, wherein after the target engine torque exceeds the set value, the accumulation means discontinues the accumulating operation if the increase of the degree of opening of the accelerator pedal equals or exceeds a predetermined level.

9. A down-shift control system as claimed in claim 6, wherein after the target engine torque exceeds the set value, the accumulation means discontinues the accumulating operation if the increase of the degree of opening of the accelerator pedal equals or exceeds a predetermined level.

10. A down-shift control method for a vehicle having an automatic transmission, comprising the steps of:

calculating a target driving force of the vehicle according to a degree of opening of an accelerator pedal and a speed of the vehicle;

detecting a present shift position of the vehicle; calculating a target engine torque based on the calculated target driving force and the present shift position;

comparing the target engine torque with a set value determined according to the present shift position and torque characteristics of an engine of the vehicle;

accumulating data relating to the degree of opening of the accelerator pedal when it is judged in the comparing step that the target engine torque equals or exceeds the set value; and outputting a command for executing a down-shift operation when an accumulated value of the data obtained in the accumulating step exceeds a threshold relating to the degree of opening of the accelerator pedal.

11. A down-shift control method as claimed in claim 10, wherein the command for executing the down-shift operation is outputted when an increase of the degree of opening of the accelerator pedal exceeds a threshold during the accumulating step relating to the degree of opening of the accelerator pedal.

12. A down-shift control method as claimed in claim 10, wherein the accumulating step comprises counting increments whose count value is increased every time it is judged that the target engine torque exceeds the set value.

13. A down-shift control method as claimed in claim 11, wherein the accumulating step comprises counting increments whose count value is increased every time it is judged that the target engine torque exceeds the set value.

14. A down-shift control method as claimed in claim 10, wherein the accumulating step comprises detecting a duration time of pressing the accelerator pedal measured from the time when it is judged that the target engine torque exceeds the set value.

15. A down-shift control method as claimed in claim 11, wherein the accumulating step comprises detecting a duration time of pressing the accelerator pedal measured from the time when it is judged that the target engine torque exceeds the set value.

16. A down-shift control method as claimed in claim 11, wherein after the target engine torque exceeds the set value, the accumulating step is discontinued if the increase of the degree of opening of the accelerator pedal equals or exceeds a predetermined level.

17. A down-shift control method as claimed in claim 13, wherein after the target engine torque exceeds the set value, the accumulating step is discontinued if the increase of the degree of opening of the accelerator pedal equals or exceeds a predetermined level.

18. A down-shift control method as claimed in claim 15, wherein after the target engine torque exceeds the set value, the accumulating step is discontinued if the increase of the degree of opening of the accelerator pedal equals or exceeds a predetermined level.

* * * * *